United States Patent
Hanawa et al.

(10) Patent No.: US 6,824,153 B2
(45) Date of Patent: Nov. 30, 2004

(54) STEERING DEVICE (75) Inventors: Nobumichi Hanawa, Minato-ku (JP); Masaru Mishima, Minato-ku (JP)

(73) Assignee: Kayaba Industry Co., Ltd., Minato-ku (JP)

( * ) Notice: Subject to any disclaimer, the term of this patent is extended or adjusted under 35 U.S.C. 154(b) by 0 days.

(21) Appl. No.: 10/464,496

(22) Filed: Jun. 19, 2003

(65) Prior Publication Data

US 2003/0234508 A1 Dec. 25, 2003

(30) Foreign Application Priority Data

Jun. 21, 2002 (JP) .......................... 2002-180959
Jan. 30, 2003 (JP) .......................... 2003-021917

(51) Int. Cl.[7] .............................................. B62K 21/08
(52) U.S. Cl. ................................... 280/272; 188/306
(58) Field of Search ................................ 280/272, 271, 280/89, 89.13, 89.11, 90, 280; 188/306, 314

(56) References Cited

U.S. PATENT DOCUMENTS

| | | | | |
|---|---|---|---|---|
| 2,009,678 A | * | 7/1935 | Pennington | .................. 188/288 |
| 4,736,962 A | | 4/1988 | Motrenec | |
| 4,773,514 A | | 9/1988 | Gustafsson | |
| 5,492,033 A | | 2/1996 | Hopey | |
| 5,516,133 A | * | 5/1996 | Motrenec et al. | ........... 280/272 |
| 5,836,213 A | | 11/1998 | Hopey | |
| 5,927,740 A | | 7/1999 | Hopey | |
| 2002/0175489 A1 | * | 11/2002 | Hasegawa et al. | .......... 280/272 |
| 2003/0146594 A1 | * | 8/2003 | Bunya et al. | ................ 280/272 |

FOREIGN PATENT DOCUMENTS

| | | |
|---|---|---|
| EP | 0 695 683 A1 | 7/1996 |
| JP | 47-17526 | 6/1972 |

* cited by examiner

Primary Examiner—Anne Marie Boehler
(74) Attorney, Agent, or Firm—Rabin & Berdo, P.C.

(57) ABSTRACT

A steering device for a two-wheeler of the present invention includes: a frame; a support member for a front wheel; a steering shaft connecting the support member to the frame so as to be rotatable about an axis thereof; and a rotary type steering damper providing a hydraulic resistance force in no matter which direction the support member rotates with respect to the frame. The steering damper has a vane adapted to swing in synchronism with rotation of the support member, oil chambers defined on both sides of the vane and filled with working fluid, a flow passage causing working fluid to flow from one oil chamber to the other oil chamber as the vane swings, and a damping valve arranged in a flow passage for the working fluid, and an opening of the damping valve is varied by a signal from outside to thereby generate a damping force optimized according to the travel condition.

6 Claims, 8 Drawing Sheets

STEERING DEVICE

BACKGROUND OF THE INVENTION

1. Field of the Invention

This invention relates to an improved two-wheeler steering device having a rotary type steering damper.

2. Description of the Related Art

As a steering device for steering the front wheel of a two-wheeler (motorcycle), Japanese Utility Model Publication No. Sho 47-17526 proposes a device equipped with a rotary type steering damper.

According to this proposal, when deflection such as a kickback, that is, disturbance, is input to the front wheel of a two-wheeler during traveling, this deflection can be restrained by the damper described above, to prevent manipulation of the handlebar from becoming unstable.

In the above-mentioned proposed technique, however, the damping force generated by the steering damper depends solely on an orifice for controlling the damping force according to a flow rate of a working fluid. Thus, regarding steering operation for two-wheelers, it is impossible for the above-mentioned proposed technique to provide optimum damping characteristics in conformity with the traveling conditions.

SUMMARY OF THE INVENTION

It is an object of the present invention to provide a steering device, which is capable of providing optimum damping characteristics for steering operation during traveling of a two-wheeler.

Another object of the present invention is to provide a steering device which is capable of preventing generation of an excessive damping force which would lead to a heavy handlebar manipulation.

In order to attain the above objects, a steering device for a two-wheeler, according to the present invention includes: a frame of a vehicle body; a support member for a front wheel; a steering shaft connecting the support member to the frame so as to be rotatable about an axis thereof; and a rotary type steering damper providing a hydraulic resistance force no matter in which direction the support member rotates with respect to the frame. The steering damper has a vane adapted to swing in synchronism with rotation of the support member, oil chambers defined on both sides of the vane and filled with working fluid, a flow passage causing working fluid to flow from one oil chamber to the other oil chamber as the vane swings, and a damping valve arranged in a flow passage for the working fluid, and an opening of the damping valve is varied by a signal from outside to vary a damping force generated.

Further, according to another aspect of the invention, in the steering device, a fail-safe valve is arranged in the flow passage for the working fluid so as to be in parallel with the damping valve, the damping valve is constructed of a proportional electromagnetic valve adapted to be closed upon extinction of exciting current, and the fail-safe valve is constructed of an electromagnetic valve adapted to be closed upon application of exciting current and to be opened by a resilient force upon extinction of exciting current.

Further according to yet another aspect of the invention, in the steering device, a relief valve is arranged in the flow passage for the working fluid so as to be in parallel with the damping valve, the damping valve is constructed of a proportional electromagnetic valve adapted to be closed upon an increase in exciting current, and the relief valve is adapted to be closed by a resilient force, the relief valve being opened upon sensing a hydraulic pressure when the damping valve is closed.

DESCRIPTION OF THE PREFERRED EMBODIMENTS

Embodiments of the present invention will now be described with reference to the drawings.

Figure 1:
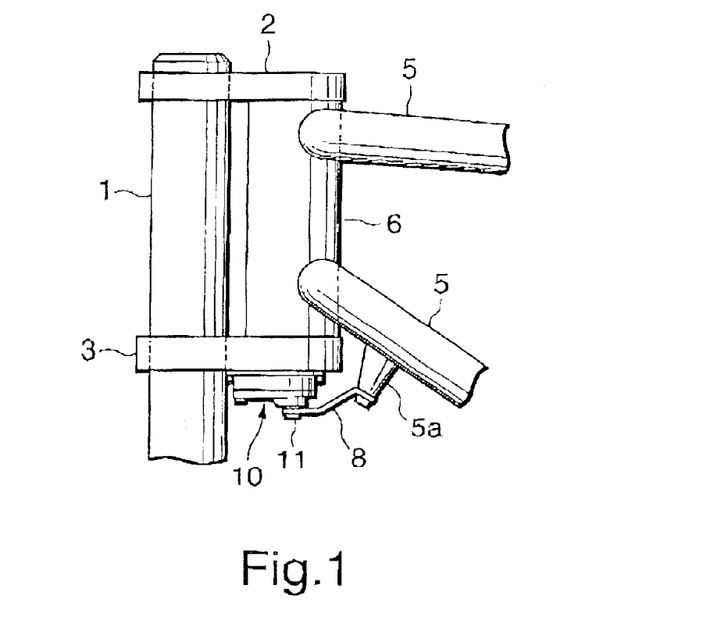
FIG. 1 is a side view of a main portion of a steering device according to the present invention.
Figure 2:
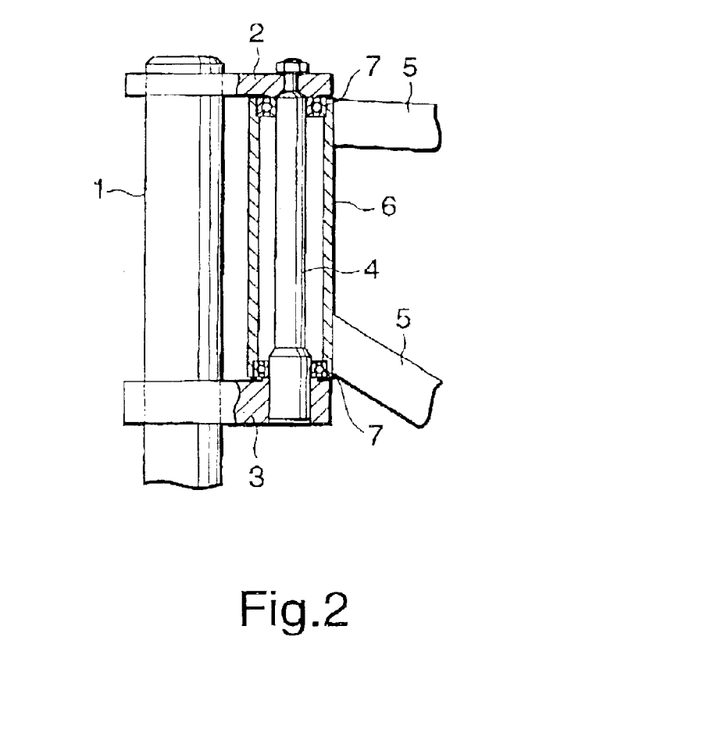
FIG. 2 is a sectional view of the same.

First, FIGS. 1 and 2 show a main portion of a steering device of an automotive two-wheeler (motorcycle or the like).

As shown in FIG. 1, fixed to the upper end portion of a front fork 1 (front wheel support member) supporting the front wheel are an upper bracket 2 and an under (lower) bracket 3, which are spaced apart from each other.

As shown in FIG. 2, a steering shaft 4 is connected between the upper bracket 2 and the under bracket 3 so as to extend parallel to the front. fork 1. A head pipe 6 is fitted onto the outer side of the steering shaft 4, and a pair of bearings 7 exist between the steering shaft 4 and the head pipe 6, whereby the head pipe 6 can freely rotate around the steering shaft 4.

The front-end portion of a frame 5 of a vehicle body is fixed to the head pipe 6 by welding or the like. In this embodiment, upper and lower pipe members form the front-end portion of the frame 5.

The handlebar (not shown) is connected to the upper surface of the upper bracket 2 or to the upper end of the steering shaft 4.

Due to this construction, when the handlebar is manipulated, the front fork 1 rotates together with the steering shaft 4 around the head pipe 6, which is integrated with the frame 5, thereby changing the orientation of the front wheel.

An external force, such as shimmy or kickback, input to the front wheel during traveling, is transmitted to the front fork 1, which may impair the stability in the manipulation of the handlebar. To restrain the input of such an external force, a rotary type steering damper 10 is provided.

As shown in FIG. 1, the rotary type steering damper 10 is mounted to the lower surface of the under bracket 3 such that a damper rotation shaft 11, described below, is coaxial with the steering shaft 4. The damper rotation shaft 11 is connected to a boss portion 5a of the lower portion of the frame 5 through a link 8. One end of the link 8 is firmly attached to the damper rotation shaft 11, whereas the other end of the link 8 is rotatably connected to a supporting point of the boss portion 5a. As a result, when the link 8 rotates, the damper rotation shaft 11 rotates.

When the under bracket 3 rotates around the steering shaft 4 and the head pipe 6 through manipulation of the handlebar, the steering damper 10 also rotates around the damper rotation shaft 11, with the result that the damper rotation shaft 11 connected to the link 8 rotates.

Note that, for convenience of illustration, FIG. 2 shows the steering device with no steering damper 10 attached thereto.

Next, a construction of the steering damper 10 will be described with reference to FIG. 3.

The steering damper 10 has a housing 13, in which there is formed an operation chamber substantially shaped as a quarter of a circle including the center thereof. The damper rotation shaft 11 is rotatably mounted at the center of the circle, and the interior of the operation chamber is divided into two oil chambers R1 and R2 by a vane 12 connected to the damper rotation shaft 11. When the damper rotation shaft 11 rotates, the vane 12 swings with the rotation, with its distal end moving along an arcuate inner peripheral wall 13a of the operation chamber. As a result, the respective volumes of the oil chambers R1 and R2 undergo changes contrary to each other. That is, when the volume of one increases by a certain amount, that of the other decreases by the same amount.

The oil chambers R1 and R2 are filled with working fluid, which moves from one to the other of the oil chambers with the above-mentioned changes in their volumes thereof.

The vane 12 is equipped with an orifice 12a allowing communication between the oil chambers R1 and R2. Thus, when the vane 12 moves, part of the working fluid passes through the orifice 12a, with the result that there is generated a predetermined basic damping force offering hydraulic resistance to the movement of the vane 12.

In many cases, in a rotary type damper of this type, working fluid is allowed to flow through the gap between the distal end of the vane and the inner peripheral wall opposed thereto when the vane moves, and the resistance offered when the working fluid flows through this gap also helps to generate a predetermined damping force.

Thus, in the steering damper 10 of the present invention, as long as a predetermined damping force is generated when the vane 12 moves within the operation chamber, basically, an arbitrary one of the above constructions may be selected.

And, apart from this, in the present invention, a damping valve 20 is provided in the flow passage into which the working fluid from the oil chambers R1 and R2 is led. The damping valve 20 allows arbitrary adjustment of the opening thereof and consequently, is capable of varying the damping force generated.

In this case, in order that the working fluid flowing out of the oil chambers R1 and R2 may flow toward the damping valve 20 always from the same direction, check valves 14 and 15 are respectively provided in flow passages L1 and L2, which are respectively connected to the oil chambers R1 and R2. Further, check valves 16 and 17 are also respectively provided in flow passages L3 and L4 for guiding the working fluid flowing out of the damping valve 20 to the oil chambers R2 and R1.

The flow passage L3 is connected to the flow passage L2, and the flow passage L4 is connected to the flow passage L1, thereby generally forming circuits in parallel with each other. And, the above-mentioned damping valve 20 is provided in a flow passage L5 short-circuiting halfway through these parallel circuits, that is, in a one-way flow passage through which working fluid flows always in the same direction.

Figure 3:
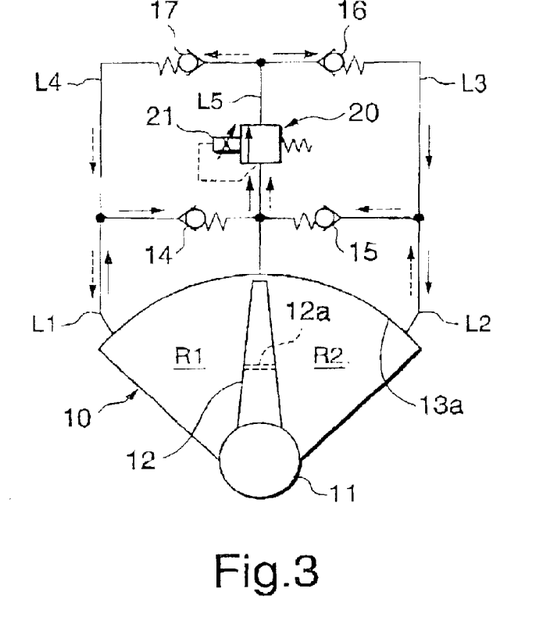
FIG. 3 is a diagram showing a construction of a steering damper according to a first embodiment of the present invention in terms of a principle of operation.

As a result, as indicated by solid-line arrows in FIG. 3, the working fluid flowing out of one oil chamber R1 flows from the check valve 14 of the flow passage L1 to the damping valve 20 and, further, through the check valve 16 of the flow passage L3 before flowing into the other oil chamber R2 from the flow passage L2.

Further, as indicated by dashed-line arrows in FIG. 3, the working fluid flowing out of the other oil chamber R2 flows through the check valve 15 of the flow passage L2, the damping valve 20, and the check valve 17 of the flow passage L4 before flowing into the other oil chamber R1.

Since these flows pass through the same damping valve 20, damping forces of the same characteristics, that is, damping forces of the same magnitude are generated.

Accordingly, the characteristics of the damping force generated by the steering damper 10 are such as can be obtained by synthesizing the damping force generated by the flow passing through the orifice 12a or through the gap at the distal end of the vane 12 with the damping force generated by the flow passing through the damping valve 20. When the damping valve 20 is totally closed, the damping force becomes maximum. The larger the opening of the damping valve 20, the smaller the damping force generated.

The damping valve 20 will now be described in detail. The damping valve 20 is formed as a proportional electromagnetic valve. Through application of an exciting current, which serves as an external signal to be supplied to a solenoid 21, its opening is varied, and the damping force generated is changed. In this embodiment, as the exciting current supplied to the solenoid 21 increases, the opening becomes larger, and, consequently, the flow passage resistance becomes smaller, resulting in a reduction in the damping force generated.

Further, the damping valve 20 is designed in a relief valve structure. When the pressure of the oil from the flow passage L1 or the flow passage L2 exceeds a fixed value, the valve is brought into the open state even if no exciting current is being applied to the solenoid 21. In this state, the maximum value of the damping force is regulated.

Thus, in this damping valve 20, by reducing or extinguishing the exciting current for the solenoid, a state in which large damping force is generated is maintained. In this state, it is possible to prevent unsteadiness in the manipulation of the handlebar during high-speed traveling of the automotive two-wheeler. Further, it is possible to prevent deflection of the handlebar even if the front wheel receives a kickback. Conversely, when the speed is reduced from high speed traveling for cornering traveling, etc., the solenoid exciting current is increased and the damping force generated is reduced, thereby making it possible to facilitate the manipulation of the handlebar.

In this way, it is possible to control the damping force generated by the steering damper 10 so as to optimize it according to the traveling condition of the two-wheeler, thereby making it possible to, enhance the operational stability for the two-wheeler.

Further, since the working fluid always flows through the damping valve 20 from the same direction, it is possible to generate a damping force of the same characteristics no matter which direction the handlebar is manipulated.

Next, a second embodiment of the present invention shown in FIG. 4 will be described.

A steering damper of this embodiment differs from the steering damper 10 of the embodiment shown in FIG. 3 in that it is equipped with an accumulator 40 for oil temperature compensation. Further, the setting of the damping valve 20 is changed.

The accumulator 40 is connected to a flow passage L5 at a position on the downstream of the damping valve 20 and between the check valves 16 and 17. The accumulator 40 is filled with working oil under a certain pressure; even when the oil temperature rises and the oil expands with the operation of the steering damper 10, the expansion is absorbed by the accumulator 40, whereby it is possible to prevent an abnormal increase in inner pressure to thereby avoid damage of the seal, breakage of the flow passage, etc.

The damping valve 20 of this embodiment, which is a proportional electromagnetic valve undergoing changes in the damping force it generates according to the current applied to the solenoid 21, differs from that shown in FIG. 3 in that its opening decreases as the exciting current applied to the solenoid 21 increases, thereby enhancing the damping force generated.

Thus, in this case, even when, for example, the exciting current for the solenoid 21 of the damping valve 20 is increased in order to enhance the damping force generated by the steering damper 10 during high-speed traveling of the automotive two-wheeler, it is possible to sufficiently supply an electric current of the requisite magnitude since the power generation of the alternator mounted to the automotive two-wheeler also increases during high-speed traveling.

Next, a third embodiment will be described with reference to FIGS. 5 and 6.

Figure 5:
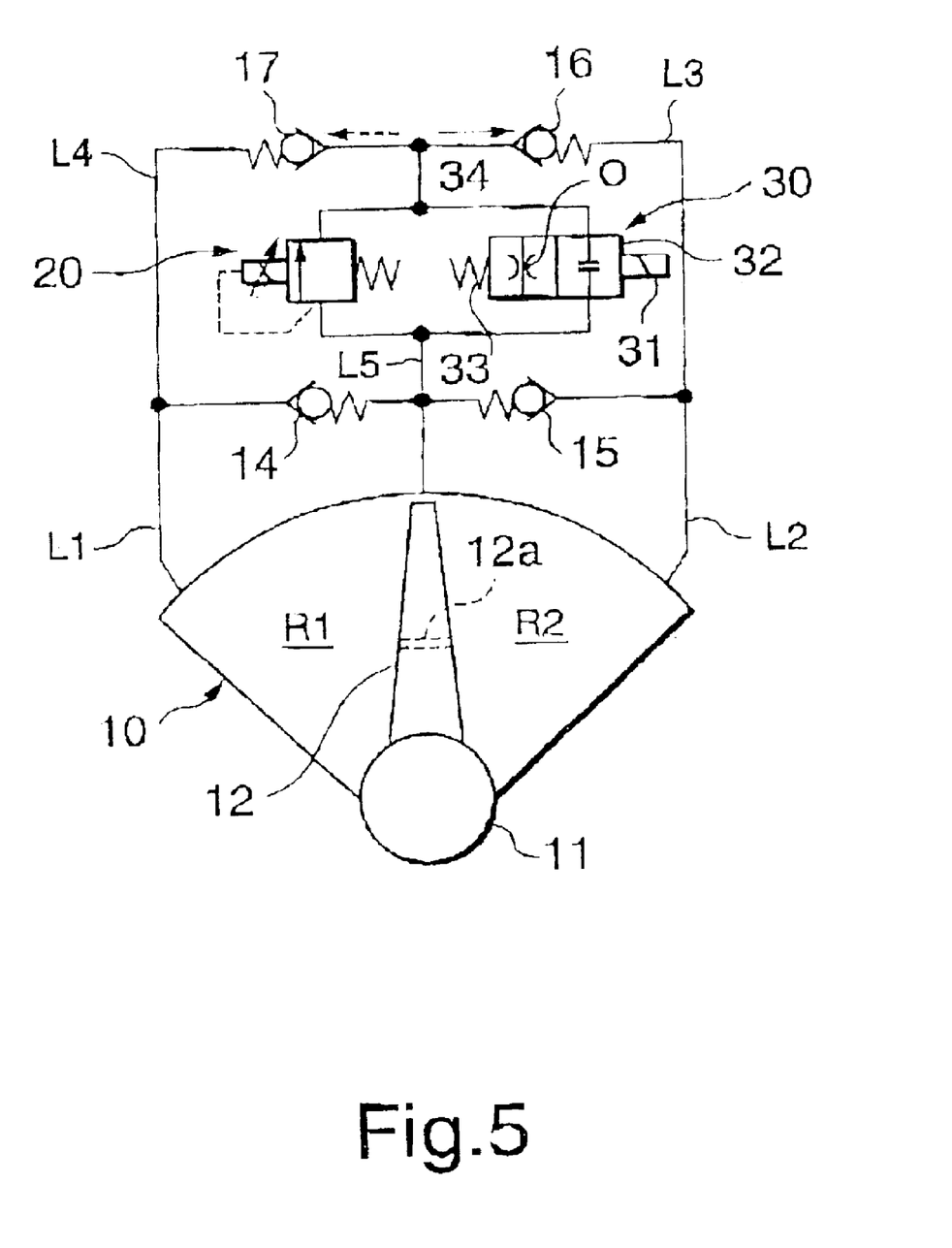
FIG. 5 is a diagram showing a construction of a steering damper according to a third embodiment of the present invention in terms of a principle of operation.

As shown in FIG. 5, in this embodiment, a damping valve 20 and a fail-safe valve 30 are arranged in parallel in the flow passage L5. The fail-safe valve 30 is formed as an electromagnetic opening/closing valve which is closed when the exciting current is applied and is opened when the exciting current is extinguished, regulating the flow rate by means of an orifice.

That is, the fail-safe valve 30 assumes an interception position 32 when exciting current is being applied to a solenoid 31 thereof, and, when the exciting current for the solenoid 31 is extinguished, it assumes a communication position 34, at which it is maintained by the urging force of a return spring 33; when the valve is at the communication position 34, flow rate control is effected through an orifice.

The damping valve 20 is the same as that shown in FIG. 3; its opening increases upon application of an exciting current.

Thus, when a control current from a control device (not shown) is being applied to the damping valve 20 and the fail-safe valve 30, the opening of the damping valve 20 varies according to the magnitude of the exciting current, and the fail-safe valve 30 is maintained at the interception position 32, whereby all the working fluid flowing out of the oil chambers R1 or R2 of the steering damper 10 passes through the damping valve 20, resulting in generation of a predetermined damping force.

In contrast, at the time of failure, that is, when no current is supplied due to a failure or the like of the control device for supplying exciting current to the damping valve 20 and the fail-safe valve 30, the damping valve 20 is closed, whereas the fail-safe valve 30 is switched to the communication position 34 by the urging force of the return spring 33 and maintained at this position.

Thus, all the working fluid from the flow passages L1 and L2 passes through the orifice of the fail-safe valve 30 at the communication position 34; at this time, a damping force due to the orifice is generated.

In this way, even if there is some abnormality in the power source, etc. and the supply of the electric current is cut off, it is possible to generate a predetermined damping force due to the orifice, thus providing a so-called fail-safe function.

The damping valve 20 also functions as a relief valve. However, the relief valve only opens when the oil pressure in the flow passage L1 or L2 has become very high; in this case, the generating damping force is rather excessive, so that a very heavy handlebar manipulation is inevitable.

Figure 6:
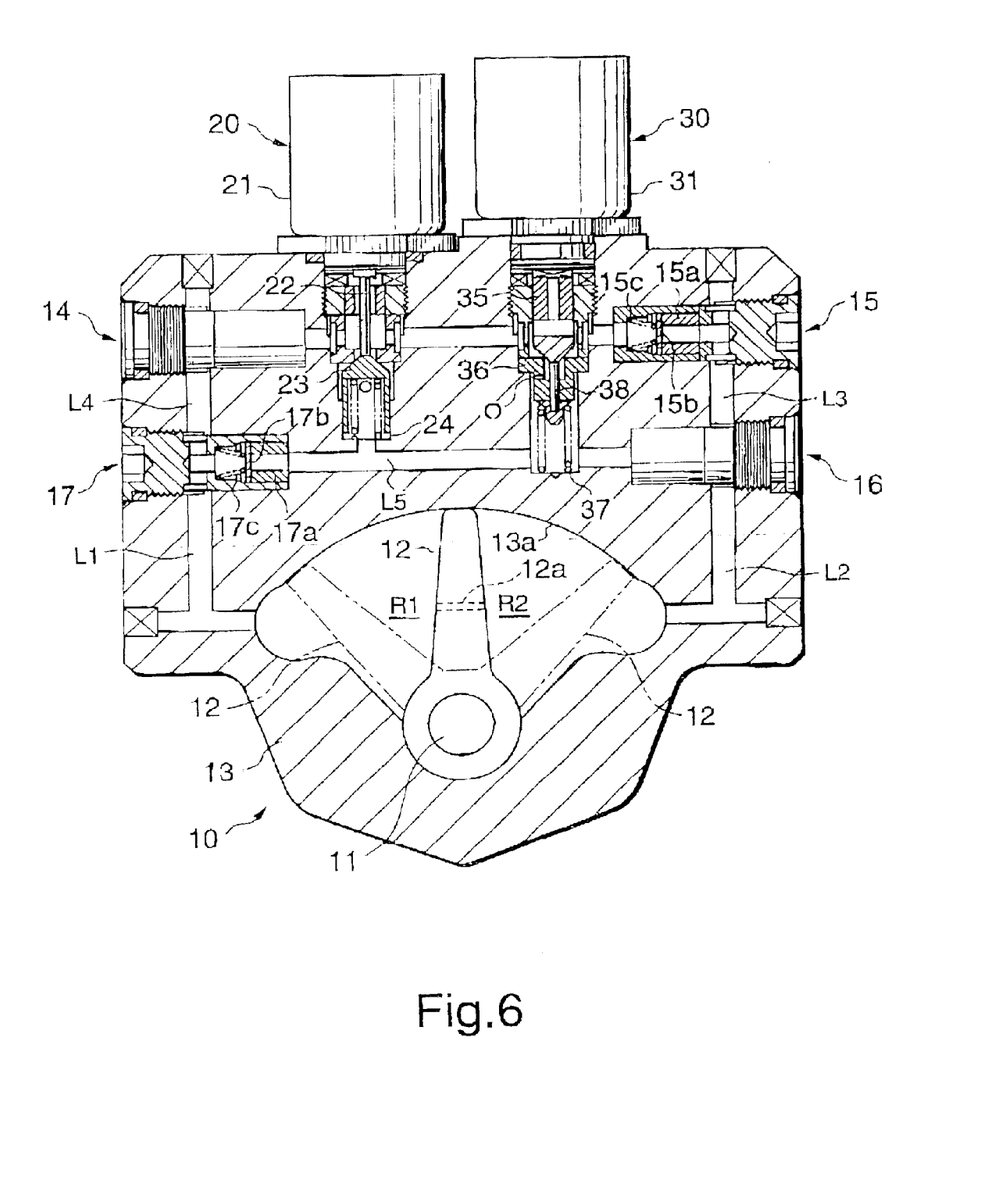
FIG. 6 is a sectional view concretely showing a construction of the steering damper of FIG. 5.

FIG. 6 concretely shows the construction of the steering damper 10 of FIG. 5.

The main vibration applied to the steering device of the present invention is in the axial direction of the front fork 1, that is, in the axial direction of the damper rotation shaft 11, so that, in this construction, the check valves 14, 15, 16, and 17, the damping valve 20, and the fail-safe valve 30 are arranged such that their operating direction is substantially horizontal so as to cross the axial direction of the input shaft, thereby stabilizing the operational characteristics of these valves are secured.

As a result, the vibration in the front wheel of the automotive two-wheeler during traveling does not interfere with the operation of the check valves 14, 15, 16, and 17, the damping valve 20, and the fail-safe valve 30. In other words, it is possible to prevent the above-mentioned vibration from causing malfunction of the check valves 14, 15, 16, and 17, the damping valve 20, and the fail-safe valve 30.

The check valves 14, 15, 16, and 17 are all of the same construction. Taking the check valves 15 and 17 as examples, leaf valves 15b and 17b detachably seated on valve seat members 15a and 17a are urged from behind by bias springs 15c and 17c in the opening direction.

Further, by applying an exciting current to the solenoid 21 of the damping valve 20, thrust is imparted to a push rod 22; a poppet 23 is opposed to the push rod 22, and the thrust of the push rod 22 is varied according to the solenoid exciting current, acting so as to reduce the resilient force of an bias spring 24 pressurizing the poppet 23 from behind. In this case, when the exciting current for the solenoid 21 increases, the opening of the damping valve 20 is enlarged, with the result that the damping force generated is weak.

Even if the exciting current for the solenoid 21 is extinguished, and the poppet 23 is closed, when the pressure of the working fluid that is about to enter the damping valve 20 increases, the poppet 23 is opened against the resilient force of the bias spring 24, thus providing the function of a so-called relief valve.

In the fail-safe valve 30, application of an exciting current to the solenoid 31 causes the poppet 35 to advance to be seated on the valve seat member 36 to thereby close the passage. On the other hand, when the application of electric current to the solenoid is stopped, the thrust for the poppet 35 is eliminated, so that the poppet 35 is caused to retreat through the intermediation of a push rod 38 pressurized by the urging force of an bias spring 37. At this time, the passage which has been closed by means of the poppet 35 and the valve seat member 36 is opened, allowing passage of working fluid through an orifice provided in the valve seat member 36.

Thus, with this fail-safe valve 30, at the time of failure, oil is allowed to pass through the orifice, so that even when the damping valve 20 is completely closed and it is impossible to generate a predetermined damping force in conformity with the traveling condition of the automotive two-wheeler, that is, even when the damping force becomes excessively large, it is possible for the steering damper 10 to maintain an appropriate damping force.

Next, a fourth embodiment of the present invention will be described with reference to FIGS. 7 through 11.

Figure 4:
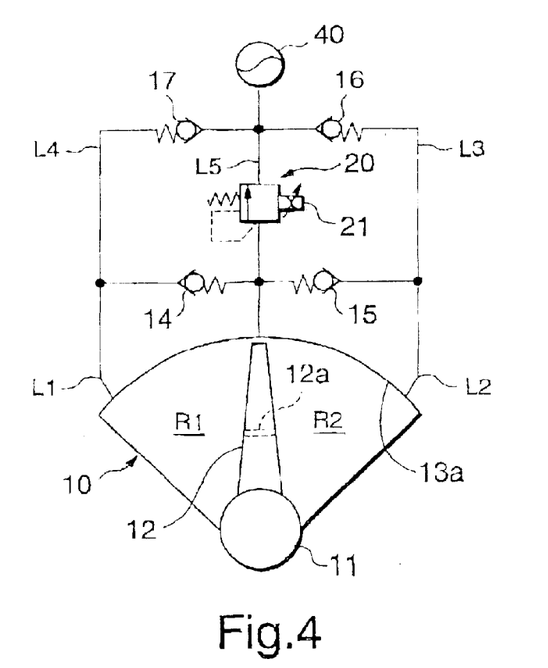
FIG. 4 is a diagram showing a construction of a steering damper according to a second embodiment of the present invention in terms of a principle of operation.
Figure 7:
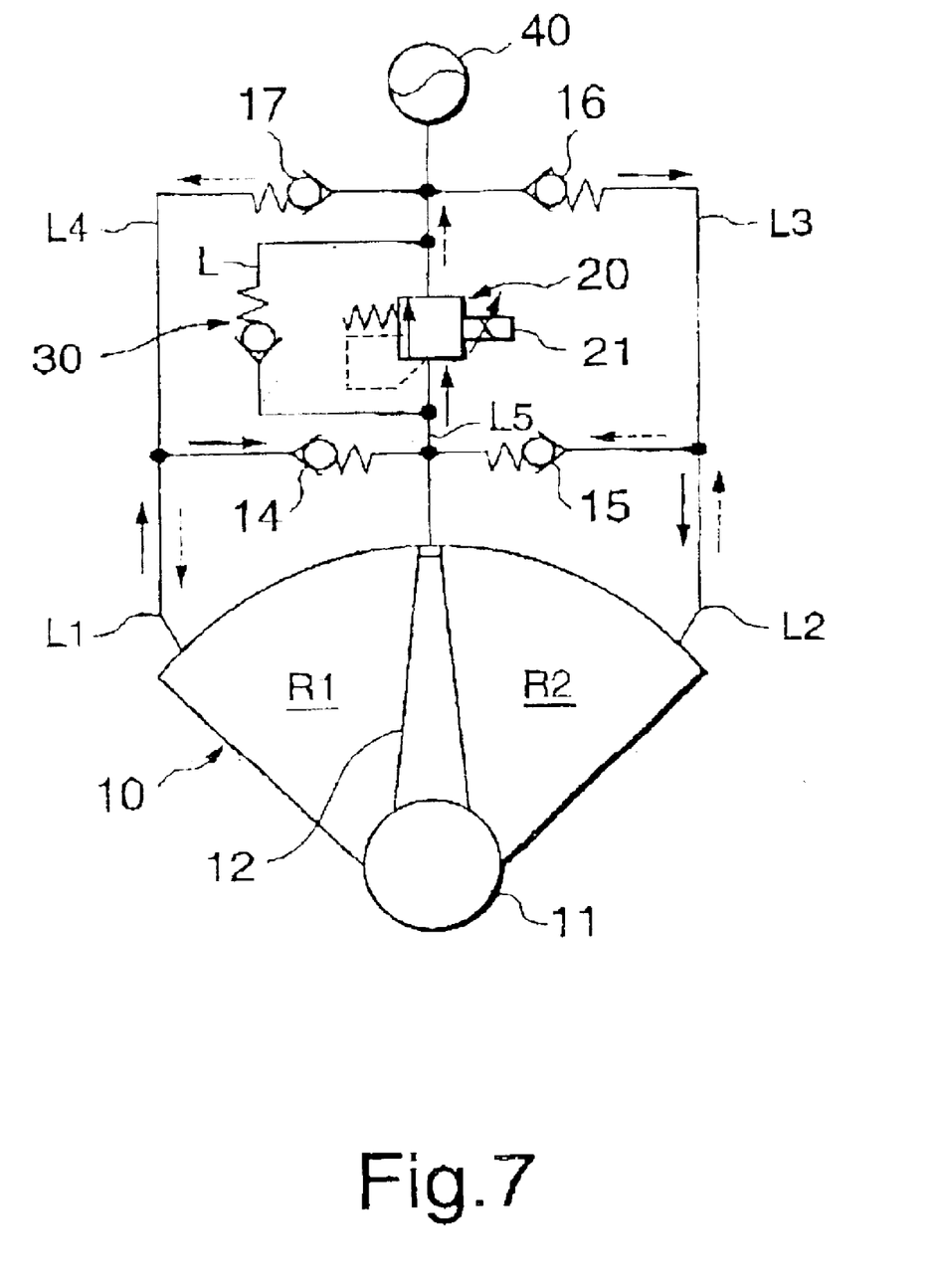
FIG. 7 is a diagram showing a construction of a steering damper according to a fourth embodiment of the present invention in terms of a principle of operation.

As shown in FIG. 7, in this embodiment, the steering damper 10 is equipped with the damping valve 20, which is the same as that of the embodiment shown in FIG. 4 and which is arranged in the flow passage L5 thereof, and a relief valve 50 in parallel therewith.

Otherwise, this embodiment has basically the same construction as that shown in FIG. 4.

As in the case of the embodiment shown in FIG. 4, when the exciting current increases, the opening of the damping valve 20 is reduced to thereby generate a large damping force. Thus, during high-speed traveling, in which the power generation by the alternator of the automotive two-wheeler is enhanced, it is possible to increase the exciting current as needed to thereby generate a large damping force.

On the other hand, when an excess current flows through the damping valve 20, the damping valve 20 is brought into the closed state, that is, the cracking pressure becomes high, and the damping force becomes excessively large, too, with the result that the steering damper 10 is brought into the locked stated.

In view of this, the relief valve 50 is arranged in parallel with the damping valve 20, whereby, even when an excess current is allowed to flow, the relief valve 50 is opened with a predetermined pressure, thereby preventing the damping force from becoming excessive.

A construction of this embodiment will be described in more detail with reference to FIGS. 8 through 11.

Figure 8:
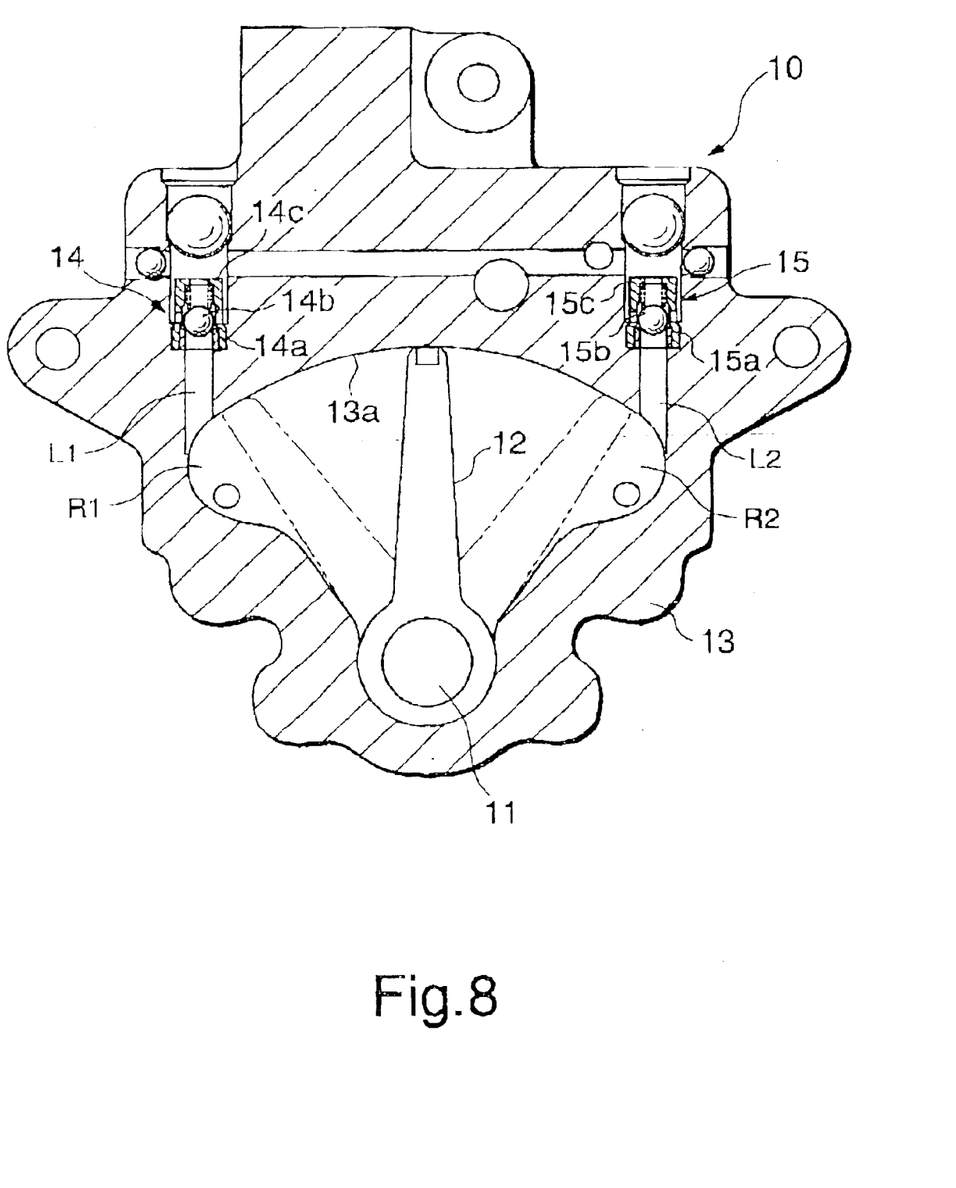
FIG. 8 is a cross-sectional view concretely showing a part of a construction of the steering damper of FIG. 7.

FIG. 8 concretely shows a construction of the components formed in the housing 13: the left and right oil chambers R1 and R2, the flow passages L1 and L2 connected thereto, and the check valves 14 and 15 provided in the flow passages L1 and L2. The left and right oil chambers R1 and R2 are defined by the vane 12; when the vane 12 rotates with the rotation shaft 11, the working fluid in the oil chambers R1 and R2 flows into the flow passages L1 and L2.

The check valves 14 and 15 are respectively composed of steel balls 14b and 15b which are detachably seated on seat members 14a and 15a, and urging springs 14c and 15c urging them from behind to open the valves.

Figure 9:
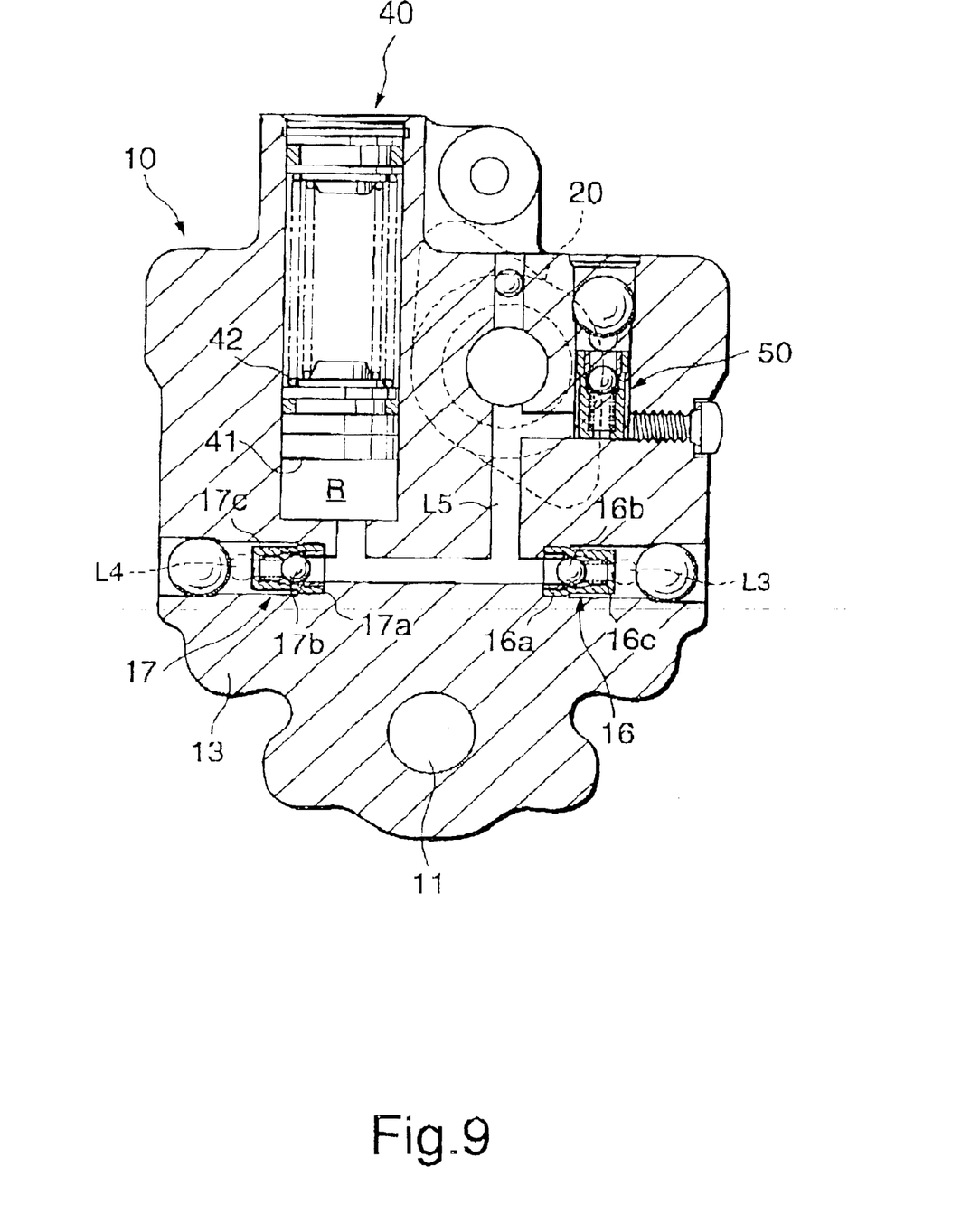
FIG. 9 is a cross-sectional view of a portion stacked on the portion shown in FIG. 8.

FIG. 9 shows a construction of the accumulator 40, the damping valve 20, the relief valve 50, and the check valves 16 and 17, which are provided in the housing 13.

In this case, the main vibration applied to the steering device is in the axial direction of the damper rotation shaft 11, so that the operating direction of the components of the check valves 16 and 17, the relief valve 30, and the accumulator 40 (described below), is substantially horizontal so as to cross the axial direction of the rotation shaft 11, whereby it is possible to prevent malfunction of these valves, etc. from being caused by vibrations applied during traveling.

In the check valves 16 and 17, steel balls 16b and 17b which are detachably seated on seat members 16a and 17a are respectively urged from behind by bias springs 16c and 17c so as to close the valves.

The accumulator 40 for effecting compensation for oil temperature rise is composed of a free piston 41 which is slidably arranged in the operation chamber R formed in the housing 13 and an bias spring 42 for pressurizing this from behind. When the working fluid expands as a result of a rise in oil temperature, the free piston 41 retreats to thereby absorb the expansion.

Figure 10:
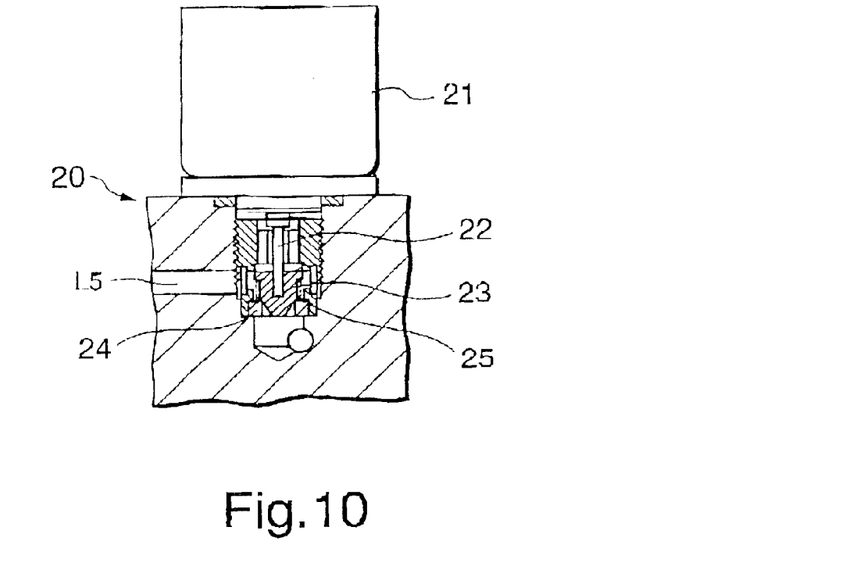
FIG. 10 is a sectional view of a construction of a damping valve.

FIG. 10 concretely shows a construction of the damping valve 20.

The damping valve 20 includes the solenoid 21, the push rod 22, the poppet 23, and the seat member 24. Through application of an exciting current to the solenoid 21, thrust is imparted to the push rod 22, and the poppet 23 is caused to advance by the thrust of the push rod 22 so as to be seated on the seat member 24. Between the poppet 23 and the seat member 24, there is arranged a return spring 25; when the thrust of the solenoid 21 is extinguished, the poppet 23 is separated from the seat member 24 to thereby secure the flow passage.

Thus, in this damping valve 20, the larger the exciting current applied to the solenoid 21, the higher the cracking pressure and the larger the damping force generated.

Thus, when an excess current flows through the solenoid 21, the damping valve 20 remains closed, and, in some cases, the steering damper 10 is brought into a locked state.

Figure 11:
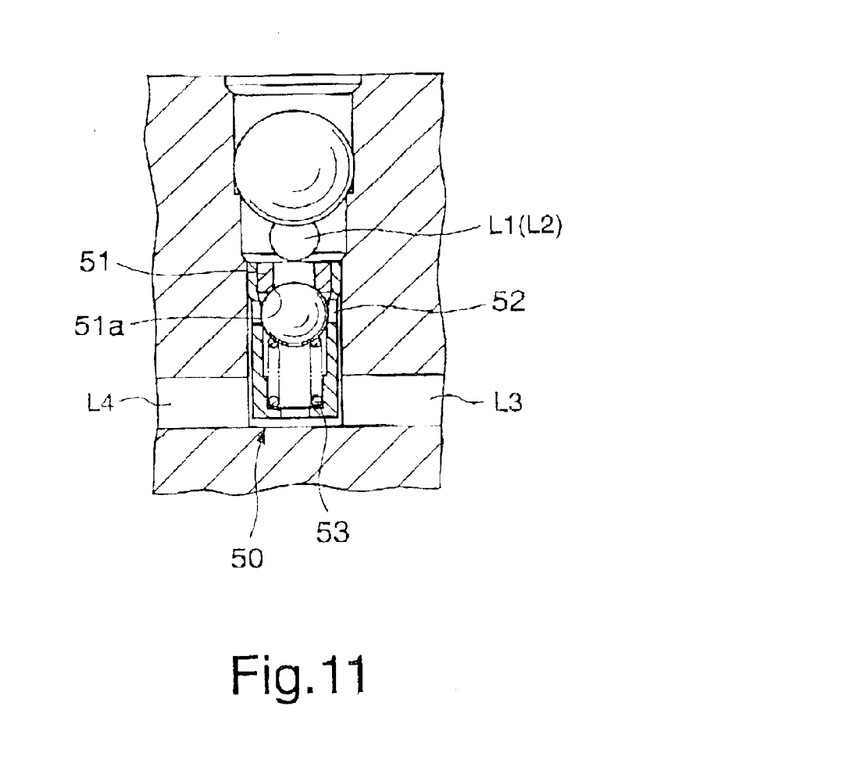
FIG. 11 is a sectional view of a construction of a relief valve.

FIG. 11 concretely shows a construction of the relief valve 50 providing a relief function in this case.

The relief valve 50 is set to a cracking pressure which is lower than the cracking pressure of the damping valve 20 when an excess current is being applied thereto.

This relief valve 50 is composed of a steel ball 52 which is detachable with respect to a seat member 51 and a coil spring 53 urging this steel ball 52 toward the seat member 51.

And, when the pressure applied to the relief valve 50 exceeds the urging force of the coil spring 53, the steel ball 52 is pushed and separated from the seat member 51 to thereby open the opening 51a.

The cracking pressure at this time is set to a level which is lower than the cracking pressure of the damping valve 20 when an excess current is being applied thereto, so that, even when an excess current is being applied, by opening the relief valve 50, it is possible to generate a predetermined damping force without the steering damper 10 being brought into the locked state.

By thus arranging the relief valve 50 in parallel with the damping valve 20, there is no need for the damping valve 20, constructed of a proportional electromagnetic valve, to be endowed with a relief valve function, which means the valve construction can be made so much the simpler. Thus, it is possible to avoid a further increase in cost, which would be caused by endowing the proportional electromagnetic valve, which is inherently expensive, with a relief valve function.

The above-described embodiments of the present invention should not be construed restrictively. It goes without saying that various improvements and modifications are possible for those skilled in the art without departing from the technical scope as set forth in the claims.

What is claimed is:

1. A steering device for a two-wheeler, comprising:
   a frame of a vehicle body;
   a support member for a front wheel;
   a steering shaft connecting the support member to the frame so as to be rotatable about an axis thereof; and
   a rotary steering damper providing a hydraulic resistance force no matter which direction the support member rotates with respect to the frame, the steering damper having:
   a vane adapted to swing in synchronism with rotation of the support member,
   oil chambers defined on both sides of the vane and filled with a working fluid,
   a flow passage allowing the working fluid to flow from one oil chamber to the other oil chamber as the vane swings, the flow passage having a one-way flow passage through which the working fluid always flows in the same direction no matter which direction the working fluid may flow between the oil chambers, and
   a damping valve arranged in the one-way flow passage, the damping valve having an opening that is varied by an outside signal to vary a damping force generated.

2. A steering device according to claim 1, wherein the damping valve comprises a proportional electromagnetic valve and generates the damping force to vary according to a magnitude of an exciting current.

3. A steering device according to claim 2, further comprising;
   a fail-safe valve arranged in the flow passage so as to be in parallel with the damping valve, wherein
   the proportional electromagnetic valve is adapted to be closed upon extinction of the exciting current, and
   the fail-safe valve is constructed of an electromagnetic valve adapted to be closed upon application of the exciting current and to be opened by a resilient force upon extinction of the exciting current.

4. A steering device according to claim 3, wherein the fail-safe valve is equipped with an orifice adapted to regulate a flow of the working fluid when the fail-safe valve is opened.

5. A steering device according to claim 2, further comprising;
   a relief valve arranged in the flow passage so as to be in parallel with the damping valve, wherein
   the proportional electromagnetic valve is adapted to be closed upon an increase in the exciting current, and
   the relief valve is adapted to be closed by a resilient force, the relief valve being opened upon sensing a hydraulic pressure when the proportional electromagnetic valve is closed.

6. A steering device for a two-wheeler, comprising:
   a frame of a vehicle body;
   a support member for a front wheel;
   a steering shaft connecting the support member to the frame so as to be rotatable about an axis thereof; and
   a rotary steering damper providing a hydraulic resistance force no matter which direction the support member rotates with respect to the frame, the steering damper having:
   a damper rotation shaft arranged coaxially with respect to the steering shaft,
   a vane joined to the damper rotation shaft and being adapted to swing in synchronism with rotation of the support member,
   oil chambers defined on both sides of the vane and filled with a working fluid, respective volumes of the oil chambers undergoing changes contrary to each other as the vane swings around the damper rotation shaft,
   a flow passage allowing the working fluid to flow from one oil chamber to the other oil chamber as the vane swings, and
   a damping valve arranged in the flow passage, the damping valve having an opening that is varied by an outside signal to vary a damping force generated; wherein
   the oil chambers are connected by the flow passage through which the working fluid flows from the one oil chamber to the other oil chamber as the vane moves,
   the flow passage forms circuits in parallel with each other,
   a one-way flow passage is provided in a short-circuiting halfway through the circuits arranged in parallel with each other, and
   the circuits in parallel with each other are equipped with a plurality of check valves such that the working fluid flows through the one-way flow passage always from the same direction from no matter which oil chamber the working fluid comes from.

* * * * *